Sept. 25, 1962  E. H. GREENBERG ET AL  3,055,150
METAL-PLATE-TREATING METHOD AND APPARATUS
Filed July 20, 1959  6 Sheets-Sheet 3

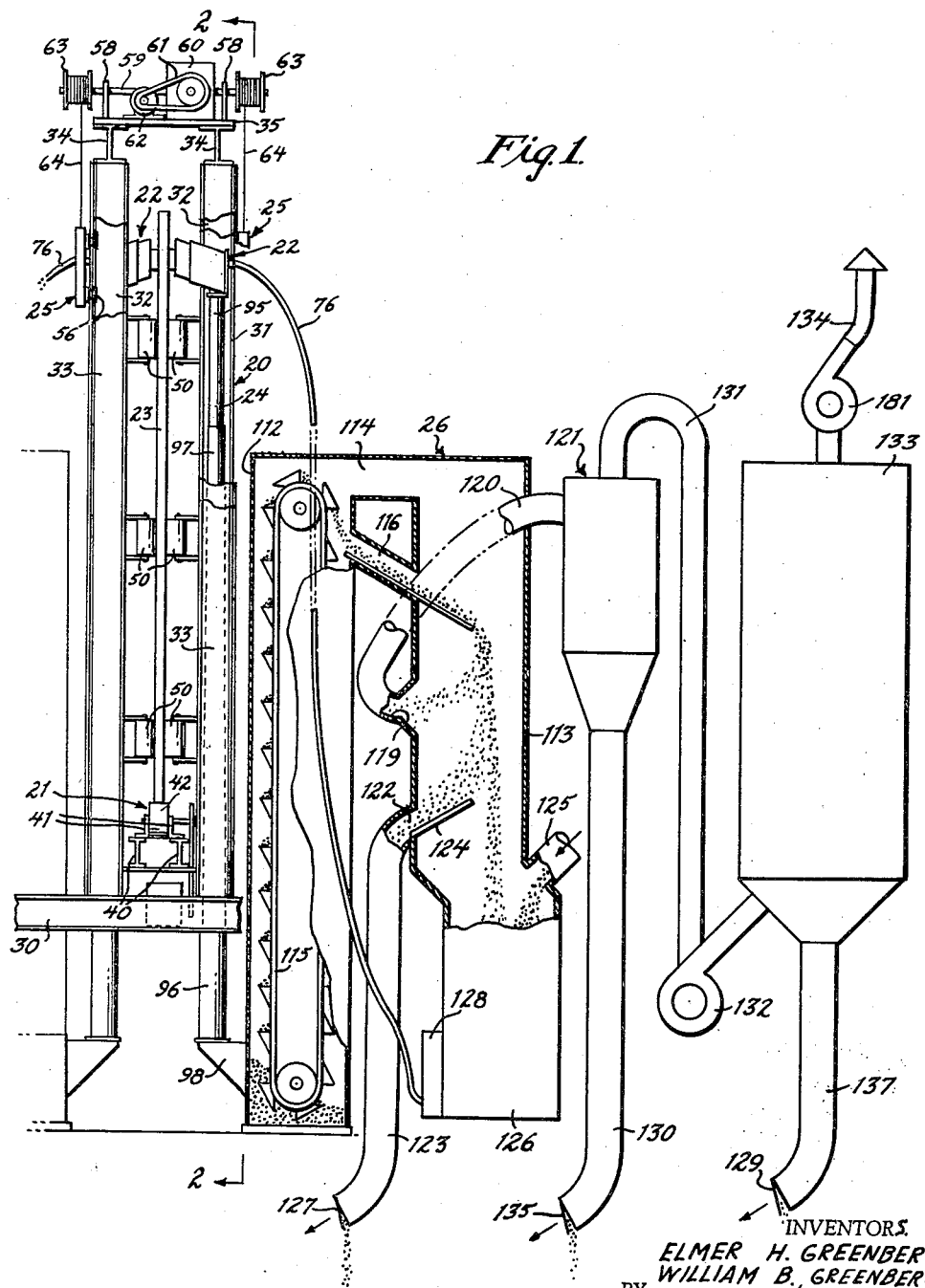

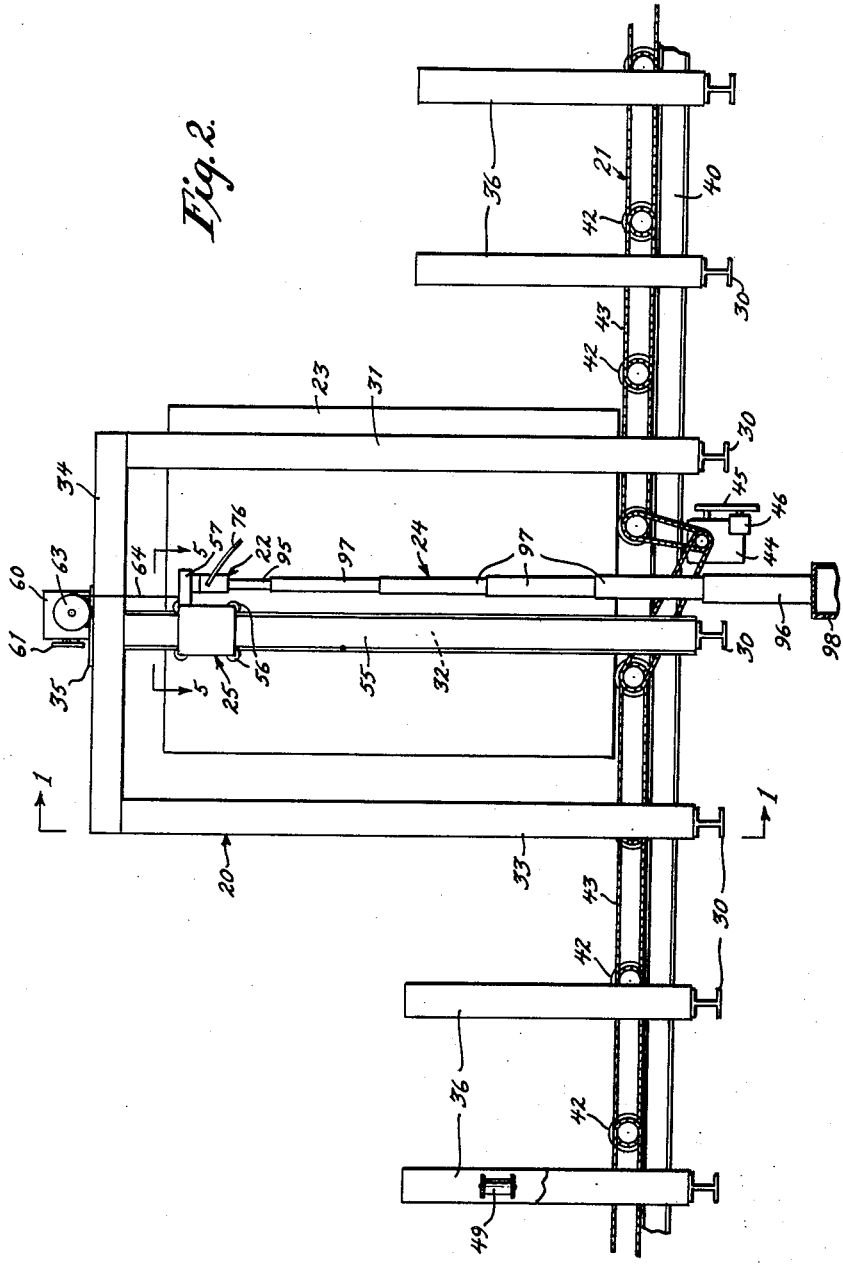

INVENTORS.
ELMER H. GREENBERG
WILLIAM B. GREENBERG
BY
ATTORNEY.

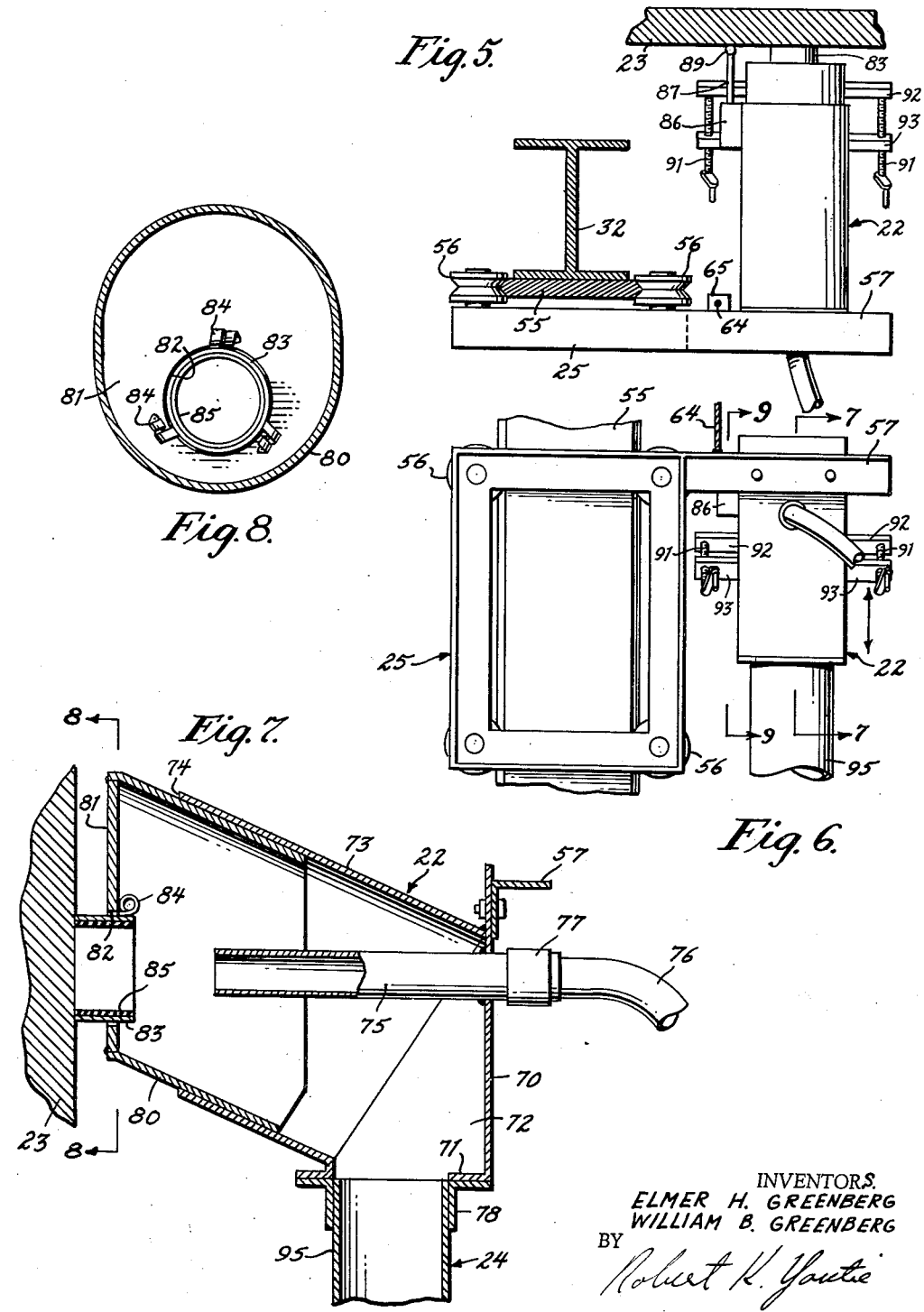

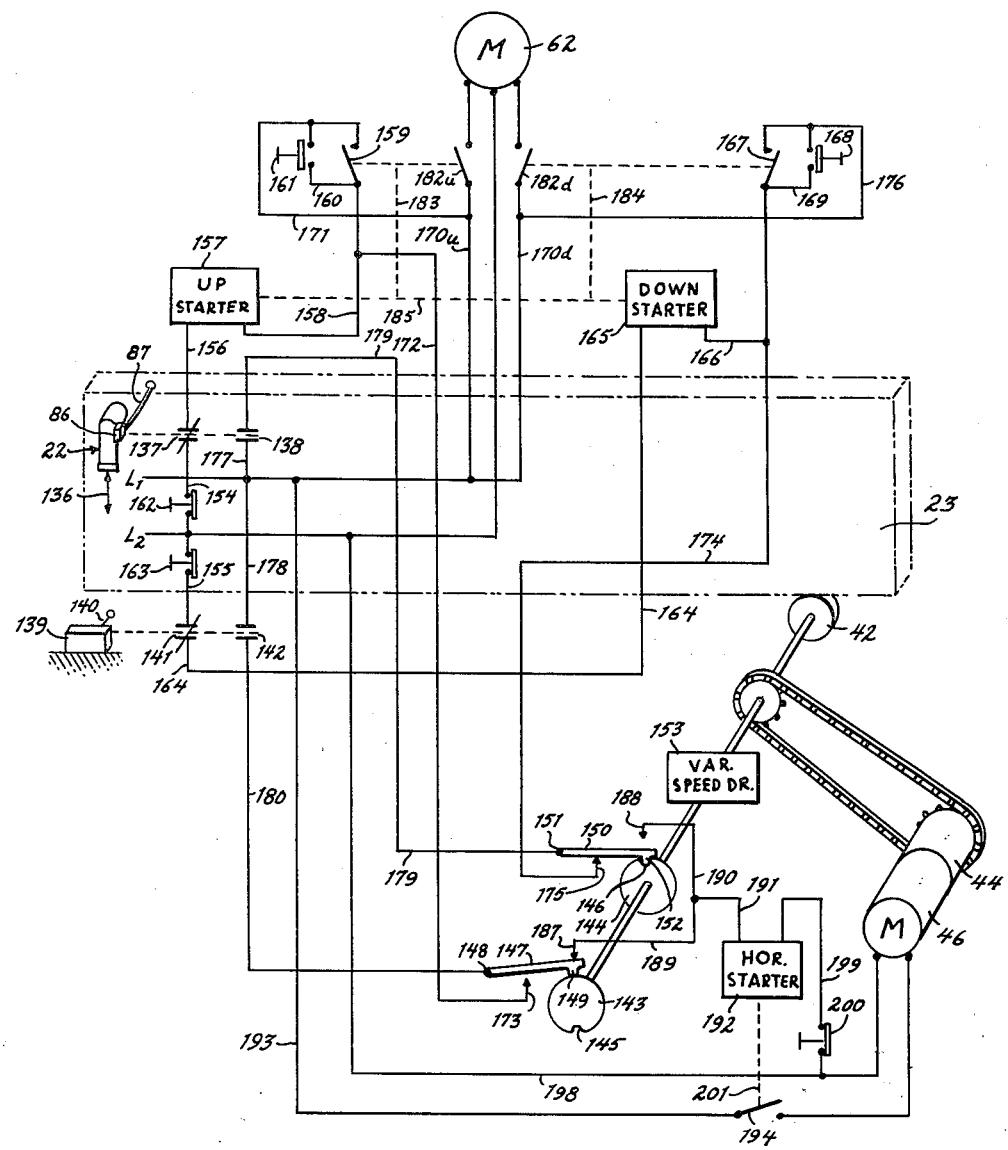

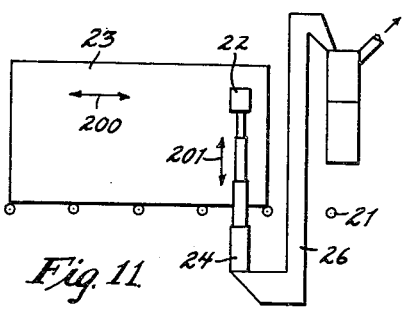
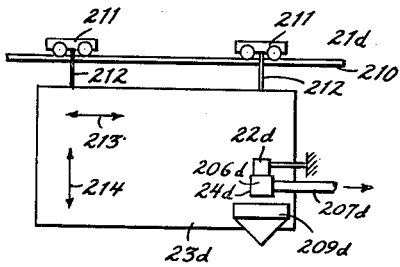
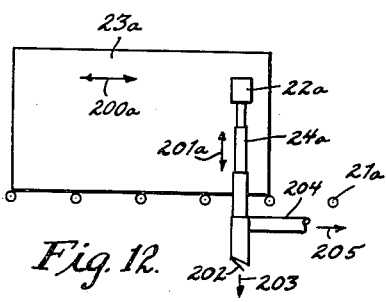
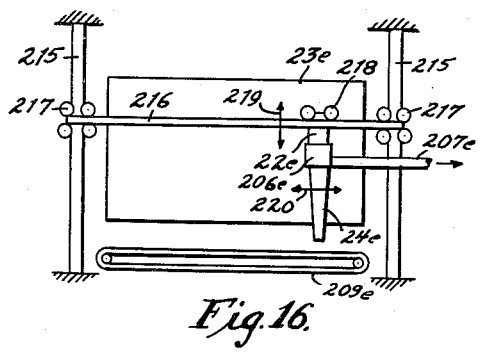
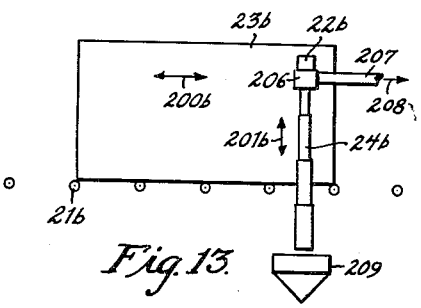
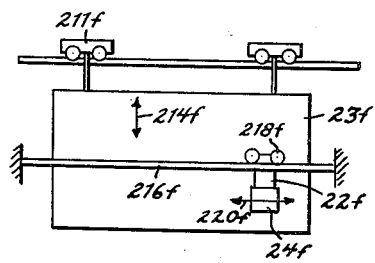
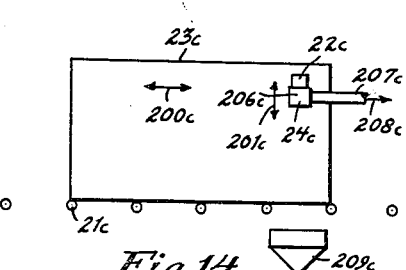

United States Patent Office 3,055,150
Patented Sept. 25, 1962

3,055,150
METAL-PLATE-TREATING METHOD
AND APPARATUS
Elmer H. Greenberg, 2500 Belmont Ave., Philadelphia 31, Pa., and William B. Greenberg, 1510 Brinton Park Drive, Wynnewood, Pa.
Filed July 20, 1959, Ser. No. 828,141
25 Claims. (Cl. 51—14)

This invention relates generally to a novel method and apparatus for the surface treating of articles. While the method and apparatus of the present invention have been primarily developed and employed for use in the surface treating or blasting of plate material, say in descaling steel plate, and will be illustrated and described hereinafter with particular reference thereto, it is appreciated that the novel features of the present invention are capable of many varied applications, all of which are intended to be comprehended herein.

As is well known to those in the metals industry, the accurate and economical removal of scale from steel plate by air blasting presents many problems. While it has, in the past, been attempted to partially mechanize this procedure, such attempts have not proved fruitful, and the process, as generally practiced, is essentially a hand operation. That is, workmen carrying portable abrasive blasting nozzles manually effect removal of scale from a steel plate by the projection of abrasive from the blasting nozzles against the surface scale, and moving the blasting nozzles about until all of the scale has been dislodged. Of course, this involves considerable labor cost, and also presents serious problems in removal of the spent abrasive and loose scale. Even if a refuse suction hood was used around the nozzle, the quantities of loose material necessary to be removed have heretofore required very large, powerful, and expensive suction equipment, and necessarily conveyed the loose material at relative high velocities causing rapid wear and breakdown of the equipment. Additional disadvantages of the conventional method reside in the lack of uniformity and reliability of the performed operation, there frequently being more or less of the plate material removed than is desirable before all the scale is removed. Thus, more time is required in manual overblasting then if automated action is used.

It is therefore one object of the present invention to provide a novel method and apparatus which is highly automatic in operation, requiring little or no attention by operating personnel to eliminate or substantially reduce labor costs.

It is another object of the present invention to provide a method and apparatus of surface treatment by abrasive wherein the ambient air is maintained substantially free of dust, eliminating health hazards to workmen in the immediate and adjacent areas.

It is a further object of the present invention to provide a method and apparatus having the advantageous characteristics mentioned in the preceding paragraphs wherein the resultant loose heavy particles may be removed by gravity and the lighter particles by relatively low air velocity, and a minimum of equipment and power required to effect such removal.

It is still a further object of the present invention to provide a method and apparatus for treating the surface of an article so that the surface is treated uniformly throughout its entire area, and with a high degree of accuracy and precision so that the treated article is well within the limits of allowable tolerances.

Still another object of the present invention resides in the provision of surface-treating apparatus having the advantageous characteristics mentioned in the preceding paragraphs which is extremely simple in structure and operation, entirely reliable and durable in use, and which can be economically manufactured, operated, and maintained.

The present invention also contemplates the provision of a simple and unique control system for the instant method and apparatus, which is substantially foolproof in operation, but affords high versatility for varied operating cycles and a wide variety of conditions.

Other objects of the present invention will become apparent upon reading the folling specification and referring to the accompanying drawings, which form a material part of this disclosure.

The invention accordingly consists of the features of construction, and combinations and arrangements of elements and method steps, which will be exemplified in the following description, and of which the scope will be indicated by the appended claims.

In the drawings:

FIGURE 1 is a transverse sectional elevational view of the apparatus of the present invention, taken substantially along the line 1—1 of FIGURE 2;

FIGURE 2 is a longitudinal sectional elevational view taken substantially along the line 2—2 of FIGURE 1;

FIGURE 5 is a horizontal sectional view taken substantially along the line 5—5 of FIGURE 2;

FIGURE 6 is a fragmentary elevational view similar to FIGURE 2, but enlarged for clarity of detail;

FIGURE 7 is a sectional elevational view taken substantially along the line 7—7 of FIGURE 6;

FIGURE 8 is a sectional view taken substantially along the line 8—8 of FIGURE 7;

FIGURE 10 is a diagrammatic representation of the control system of the instant apparatus; and FIGURES 11–17 are somewhat diagrammatic representations illustrating various structural embodiments and modes of operation in accordance with the teachings of the present invention.

Figure 4:
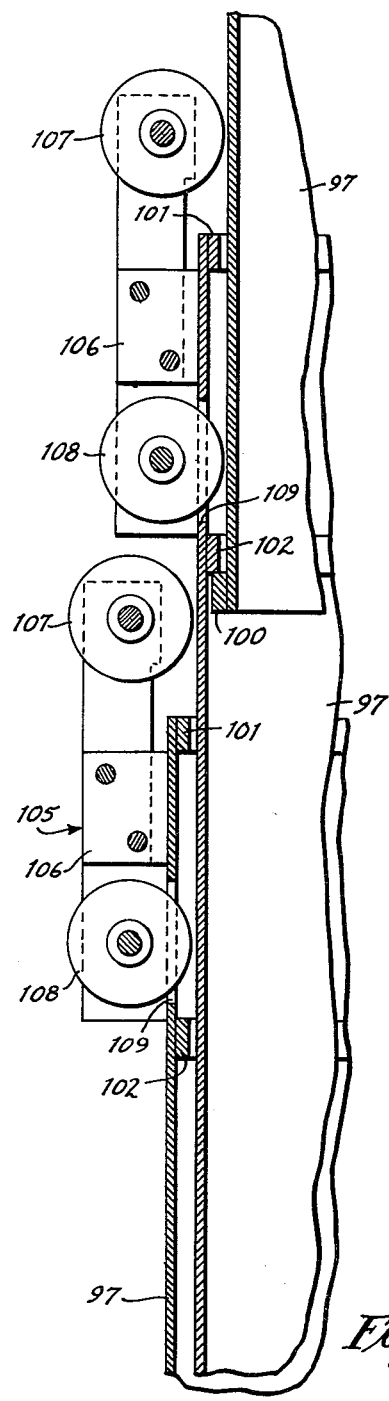
FIGURE 4 is a sectional elevational view taken substantially along the line 4—4 of FIGURE 3 illustrating in further detail the telescopic structure.

Referring now more particularly to the drawings, and specifically to FIGURES 1 and 2 thereof, a frame is generally designated 20, within which is located suitable conveyor means 21 for handling an article to be treated. An abrasive-particle-projecting head is shown at 22 for projecting a stream of abrasive against a workpiece 23 carried by the conveyor or handling means 21. Means for collecting the abrasive after engagement thereof with the workpiece 23 is generally designated 24; and, a carriage is shown at 25 for effecting movement of the projecting means or head 22 relative to the workpiece 23.

More particularly, it will be observed in FIGURE 1 that the frame 20 is symmetrical about the conveyor 21 and the workpiece or plate 23; and, that there are provided a pair of abrasive-projecting heads 22 on opposite sides of the workpiece for treating the opposite surfaces thereof. Further, there is provided the abrasive-collecting means 24 on each side of the workpiece or plate 23 associated with each head 22, the collecting means on the left side of the workpiece in FIGURE 1 being obscured by the frame members. In addition, carriage means 25 is provided on both sides of the workpiece 23 associated with respective projecting heads 22, and abrasive handling means, generally designated 26 may be associated with each of the heads 22 and collecting means 24. Hence, the apparatus for treating each side of the workpiece or plate 23 is substantially identical, so that a detailed description of only one of the duplicated elements will suffice.

The frame 20 includes a plurality of parallel spaced, crosswise base members 30, which may be embedded in or otherwise fixedly secured to an appropriate ground or other supporting surface. On each side of the conveyor 21, extending generally upward from a plurality of adjacent base members 30, are a plurality of uprights 31, 32, and 33. The uprights 31, 32, and 33 on each side of the conveyor 21 are in alignment with each other longitudinally of the conveyor, while the uprights 31 on opposite sides of the conveyor are in alignment with each other transversely of the conveyor. Also, the uprights 32 are in alignment with each other transversely of the conveyor, as are the uprights 33. Extending across the upper ends of the uprights 31, 32, 33 on each side of the conveyor 21 is a top frame member or lintel 34. The lintels 34 on opposite sides of the conveyor 21 may be connected together by a transverse mounting plate 35 bridging the space between the top members. Additional uprights 36 may be fixed at their lower ends to additional base members 30, on both sides of the conveyor 21. All of the frame members 30, 31, 32, 33, 34, and 36 may be formed of structural I-beams, or other suitable beam members, if desired. The frame members, as well as the mounting plate 35, may all be fixedly secured to each other, in the above-described arrangement, by welding or other suitable fastening means.

The conveyor means 21 includes a pair of longitudinal extending, laterally spaced, generally horizontal support members 40 fixedly secured by any suitable means between the uprights 31, 32, 33, and 36. At longitudinally spaced locations along the support beams 40 are provided pairs of upstanding journal pedestals 41, each pair of journal pedestals carrying therebetween a rotatable roller 42. Thus, a plurality of rollers 42 are arranged in longitudinally spaced relation between the uprights of the frame 20, each being journaled for rotation about a horizontally disposed axis extending transversely of the conveyor means. Suitable drive means in the form of sprocket-and-chain connections 43 may connect the various rollers 42 to each other, and to a variable-speed transmission 44 for simultaneous rotation of the rollers. The variable-speed transmission 44 may be connected through any transmission means 45 to a suitable drive means or motor 46, so that the latter effects simultaneous and equal angular velocities of all the rollers 42 for conveyance thereby of the workpiece or plate 23 resting on edge on at least two of the conveyor rollers.

In order to maintain the workpiece or plate 23 in its upright condition while resting on and being conveyed by the rollers 42, the uprights 36 may each be provided with one or more rollers 49 on their inner or facing sides for rolling engagement with a workpiece being conveyed therebetween. In addition, the relatively tall uprights 31, 32, and 33 are preferably each provided on their inner sides with a plurality of guide rollers 50 to accurately locate the workpiece 23 in its upright condition between the relatively tall frame members. If desired, the guide rollers 50 may be of an adjustable construction to vary the space therebetween.

If desired, the work-carrying rollers 42 may be provided with serrations, frictional peripheral surfaces, or other means effecting more positive roller engagement with the workpiece.

As best seen in FIGURES 2 and 5, each upright 32 is provided on its outer flange with a vertically extending plate or rail 55 which may have its vertical edges configured for engagement with wheels 56 of the carriage 25. That is, the rail 55 may consist of a vertically elongate plate fixedly secured by any suitable means in facing engagement with the outer flange of the upright member or column 32, and having its vertical edges extending beyond the supporting flange. The carriage 25, as seen in FIGURE 6, may assume the form of an open, rectangular frame having four of the wheels or rollers 56 journaled at its opposite corners for rolling movement along the rail to mount the carriage for vertical or up-and-down movement. A rigid extension or arm 57 may project horizontally from each carriage 25, to which is attached a respective abrasive-projecting head 22.

In FIGURE 2 it may be observed that the mounting plate 35 on the top members 34 is substantially directly above the uprights or columns 32 which carry the carriages 25. Mounted on the upper surface of the plate 35, are a pair of upstanding, laterally spaced journal bearings 58 which journal a transversely extending shaft 59. The shaft 59 is connected through a transmission 60, also mounted on the plate 35, and a belt 61, or other suitable power-transmission means, to a motor or variable-speed drive element 62, also mounted on the plate 35. That is, the motor 62, through the transmission means 60 and 61, effects axial rotation of the shaft 59. As will appear presently, the motor 62 is adapted to be energized for rotation in opposite directions, to effect rotation of the shaft 59 in opposite directions.

On opposite ends of the shaft 59 are provided a pair of drums or winches 63, each carrying a cable 64 coiled thereabout and depending therefrom to connection with the carriage 25 on the adjacent side of the frame structure. As may be seen in FIGURE 5, a bracket 65 is provided on the carriage arm 57, for attachment of the cable 64 to the carriage. By this means, the motor 62 may effect raising and lowering of the carriages 25.

Each of the abrasive-projecting heads 22 includes a hollow main body having a generally vertical rear wall 70 which is fixed to the adjacent carriage arm 57 to mount the head for vertical movement with the carriage. The head further includes a bottom wall 71 extending forward or toward the workpiece 23, see FIGURE 7, and a pair of side walls 72 extending upward and forward from the bottom and rear walls 70 and 71, respectively. Extending obliquely forward and upward from the side walls 72 is a generally cylindrical or tubular extension 73 of the main-head body 72, which has its distal or forward edge 74 lying in a generally vertical plane.

A generally horizontally disposed nozzle or tube 75 projects forwardly through the rear head wall 70, being fixedly secured thereto by welding or other suitable means, and is connected on its rearward end through a hose or conduit 76 with the abrasive-treating means 26, see FIGURE 1. That is, the conduit 76 is coupled, as at 77, for fluid communication through the nozzle of tube 75 with the interior of the head 22.

The bottom wall 71 of the main head body is formed with a through opening and provided on its underside with an annular flange 78 extending peripherally about the opening and connected to the collecting means 24.

Slidably and telescopically received in the forward and upper end region of the tube 73 is an extension tube 80 which surrounds the forward end of the nozzle 75 and projects forward and upward beyond the end 74 of the tube 73 a selected distance, as adjusted by a crank-operated screw 91 rotatably mounted at one end by a bracket 92 carried on the extension tube 80 and threadedly engaged with a bracket 93 on the tube 73. Fluid-pressure means may be used to move and adjust the extension tube 80 in place of the screw means 91, 92 and 93, if desired. The forward or outer end of the extension 80, beyond the end 74 of the tube 73, is disposed in a generally vertical plane and provided with a generally vertical end plate or closure 81 fixedly secured about its periphery to the extension 80, as by welding or other suitable means. The end member or closure 81 is formed with a through aperture or opening 82 in approximate alignment with the nozzle 75 and of a diameter considerably greater than that of the nozzle. An annular tube or ring 83 is spacedly received in the end-plate opening 82, extending interiorly and exteriorly thereof. The ring 83 is preferably lined with rubber or other abrasion-resistant material, as at 85. A plurality of resilient elements 84 may be employed to floatingly mount the tube 83 in the end-plate aperture 82. More specifically, the resilient elements 84 may each comprise an axially elongate helical spring or resilient strip having its opposite ends respectively secured to the tube 83 and plate 81, with the springs or strips located at circumferentially spaced locations exteriorly about the tube. In this manner, the tube 83 is resiliently yieldable longitudinally, and adapted to be tilted or canted in any desired direction against the resilient restoring forces of the mounting springs 84. Of course, the extension 80, including the floating tube 83, may be moved forward or rearward relative to the main body of the head 22 and adjusted in any selected position of its forward and rearward movement by means of the threaded shaft 91. Under certain circumstances the adjustability of the extension tube 80 may be omitted, and, the resilient mounting of the ring 83 alone serve to accommodate for plate irregularities.

While a pneumatic abrasive-projecting head 22 has been shown and described, it is understood that any suitable abrasive-projecting head may be employed, such as mechanical, centrifugal, or the like.

Figure 9:
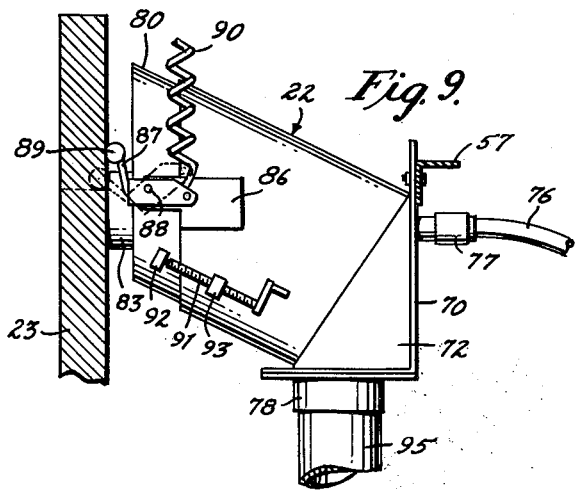
FIGURE 9 is a sectional elevational view taken substantially along the line 9—9 of FIGURE 6.

Carried exteriorly of the head 22, say on one side of the outer cylinder 73 at the forward end thereof, is an electric switch 86, see FIGURE 9. The switch 86 includes an actuating finger 87 pivoted as at 88 to effect operation of the switch. The distal end of the switch finger 87 may be provided with an anti-friction element 89, say a ball, if desired; and the electrical connections for the switch may be contained in a resiliently contractile and extensile cord 90 permitting free vertical head movement. As will appear hereinafter in greater detail, the switch 89 is actuated in one direction by engagement with the plate surface being treated, and swings to its other position of actuation upon movement beyond the upper edge of the workpiece or plate 23.

The head 22 serves in operation as a collection hood receiving abrasive particles rebounding from the treated surface inward through the floating annulus or ring 83 to pass through the head out of the bottom wall 71 into the collection means 24. Thus, the hood defined by the head 22, exclusive of the nozzle 75 may be considered as part of the collecting means 24.

The remainder of the collecting means 24 includes a plurality of open ended, telescoping tubes or cylinders, the uppermost and lowermost being respectively designated 95 and 96, and the intermediate telescopic tubes being designated 97. The uppermost telescopic tube 95 may have its upper end fixed to the flange 78 of the head 22, as seen in FIGURE 7, to open upward through the head bottom wall 71 into the interior of the head. The lower end of the lowermost telescopic tube 96 may be fixed to the upper side of a collection boot or conduit 98 as will appear more fully hereinafter. The lowermost tube 96 remains stationary, while the uppermost tube 95 moves with the head 22, and serves to extend and retract the intermediate tubes 97.

Figure 3:
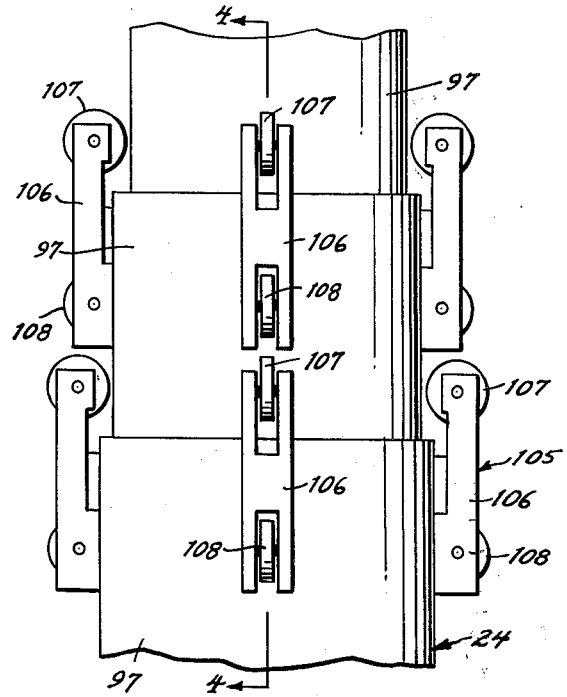
FIGURE 3 is a partial elevational view showing telescopic sections of the apparatus of FIGURES 1 and 2, but enlarged for clarity of detail.

As the telescopic connection between all of the tubes 95, 96, and 97 is all substantially identical, a typically representative connection is shown in FIGURES 3 and 4 illustrating three of the intermediate tubes 97. A lower end shoulder or external collar 100 is there illustrated on the uppermost or inner tube 97, which lower end collar extends circumferentially about the tube and is fixedly secured thereto, as by welding or other suitable means. Each of the medial and outermost or lowermost tubes 97 illustrate that an upper end internal shoulder 101 is fixedly secured by any suitable means extending peripherally about the inner surface of each tube proximate to the upper end thereof. Also, an annular, internal shoulder 102 is fixedly secured extending peripherally about the interior of each tube 97 adjacent to and spaced below the upper end shoulder 101. Of course, the tubes 97 are all identical, so that repetition in the drawing is unnecessary, it being understood that each of the tubes 97 includes a lower end external shoulder 100, an upper end internal shoulder 101, and an internal shoulder 102 adjacent to and spaced below the upper end shoulder.

The lower end of each tube 97 extends into the upper end of each next adjacent lower tube 97, with the external lower end shoulder 100 of the upper tube below the internal shoulder 102 of the lower tube. Thus, the lower end region of the upper tube 97 extends appreciably into the upper end region of the next lower tube 97; and, the upper tube is freely received in the annular shoulders 101 and 102 of the lower tube, and the external shoulder of the upper tube is freely received in the lower tube, for free sliding movement of the upper tube in the next lower tube. However, the lower end shoulder 100 of the adjacent upper tube is of an external diameter greater than the internal diameter of the shoulder 102 of the next lower tube, so that the shoulders 100 and 102 of adjacent tubes are engageable with each other to limit relative extension of the tubes, witness the uppermost and adjacent lower tubes 97 of FIGURE 4. By way of contrast, the lowermost tube 97 of FIGURE 4 is in contracted relation with respect to its next adjacent upper tube 97.

The tubes 97, as well as the upper and lower end tubes 95 and 96, are thus all freely slidably retractable and extensible relative to each other, the extension being caused by elevation of the head 22, and retraction being effected by gravity and lowering of the head. Of course, extension and retraction takes place successively, starting from the uppermost tube 95 downward, as each tube extends upward out of the next lower tube into the fully extended condition with the shoulders 100 and 102 abutting each other, and then proceeds to withdraw the next lower tube to its extended condition. In retraction, operation is just in the reverse.

While the shoulders 100, 101 and 102 may serve as guides or seals, as well as the above described extension limiting function, it is desirable to provide additional guide means, as at 105. Each of the guide means 105 includes a generally H-frame 106 fixedly secured by any suitable means to the upper external region of a tube 97 with its upper legs projecting vertically beyond the upper end of the respective tube. Journaled between the upper legs of each frame 106 is a roller 107 located above the upper end of the tube carrying the respective frame for rolling engagement with the next upper tube received in the carrying tube. A roller 108 is journaled between the lower pair of legs and enters through a wall opening 109 in the carrying tube 97 for rollable engagement with the next upper tube received in the carrying tube. A plurality of such frames 106 and their rollers 107 and 108 are mounted in spaced relation about the upper region of each tube 97 for rollable engagement with the next upper tube upon extension and retraction thereof.

The receiving boot or conduit 98, to which the lower end of the lowermost telescopic tube 96 is connected, extends laterally for connection to a lower region of the abrasive handling means 26. The abrasive handling means includes a pair of generally vertically disposed housings or casings 112 and 113 connected together at their upper ends by a generally horizontal passageway 114. The laterally extending conduit or boot 98 is connected to a lower region of the housing 112 for conveying abrasive into the bottom of the latter housing. A generally vertically disposed bucket conveyor or elevator 115 is mounted in the housing 112 for picking up abrasive in the lower region thereof and discharging the abrasive into the housing 113 in the upper region thereof. For this purpose, a passageway 116 extends obliquely downward from an upper region of the housing 112 into an upper, but slightly lower region of the housing 113. The passageway 116 is provided with a bottom plate or tray extending obliquely upward slightly into the housing 112 to catch substantially all of the abrasive discharged from the elevator 115 at its upper elevation, and extending obliquely downward considerably into the housing 113 for discharging a stream of abrasive at a desired location therein.

In a side wall of the housing 113, below the discharge level of the tray 116, is provided an outlet opening 119, which is connected through a conduit 120 to a cyclone separator 121. Also in a side wall of the housing 113, below the level of the opening 119, is an opening 122 connected to a discharge conduit 123 having a one-way or flap valve 127. A tray or plate 124 may extend obliquely upward and inward from the opening 122 to facilitate passage through the latter opening of the desired sand, as will appear presently. An inlet conduit 125 is connected to the housing 113 at a level below that of the opening 122 for discharging fresh sand into the lower region of the housing. In the lower housing region is a continuous-operation blasting machine 126, which includes a sand-and-air mixer 128 and pneumatically conveys the mixture through the conduit 76 to the head 22.

The cyclone separator is provided with a lower-end discharge conduit 130 having a one-way or flap valve 135 for removing fine sand, and an upper-end discharge conduit 131 for conveying away dust. In the conduit 131 is a blower or fan 132 which conveys the dust to a baghouse 133. The dust is collected by the baghouse for safe removal through conduit 137 having a one-way or flap valve 129, and fresh air is discharged from the baghouse through a stack 134. Another fan or blower 181 is located in the stack 134. If desired, one of the fans 132 and 181 may be omitted.

In the diagrammatic representation of FIGURE 10 showing the controls, the head or hood 22 is shown as vertically reciprocable by the arrow 136. The switch 86 is shown carried by the head 22, and including its actuating finger 87 for engagement with a plate or article 23 being operated upon. Also shown is a roller 42 for conveying the plate 23, as well as the roller drive motor 46 and a variable speed drive 44 connected in transmitting relation between the motor 46 and conveyor rollers 42. The drive motor 62 for effecting up and down movement of the head 22 is also shown in FIGURE 10.

The supply conductors or lines for both the roller or horizontal drive motor 46 and the head or vertical movement motor 62 are designated $L_1$ and $L_2$. Included in the movable switch 86 carried by the head 22 is a normally closed switch 137 and a normally open switch 138. A fixed switch assembly 139 includes a switch actuating member or finger 140 resiliently biased upward, and located in the path of movement of the switch 86 to be deflected downward by the latter at the lower end of its vertical movement to actuate the switch assembly 139. Included in the switch assembly 139 is a normally closed switch 141, and a normally open switch 142. The switches 141 and 142 are adapted to be respectively opened and closed upon downward deflection of the finger 140. Similarly, the actuating finger 87 of the switch 86 normally rides against the plate 23, being held upward thereby, and upon movement of the head 22 and switch 86 to its upper limit to pass the finger 87 beyond the upper plate edge, the finger swings downward to effect respective opening and closing of the switches 137 and 138.

Operatively connected between the horizontal drive motor 46 and the driven rollers 42, for rotation therewith or in a predetermined relation thereto, are a pair of cams 143 and 144. In the illustrated embodiment, the cams 143 and 144 are connected to the shaft of the drive roller 42 through a variable-speed drive 153 and arranged in 180° out-of-phase relation with each other. In particular, in the illustrated embodiment the cams 143 and 144 are substantially identical, each configured to define a dwell of slightly less than 360°, and a recess in the remaining region, as at 145 in the cam 143 and 146 in the cam 144. The recesses of the respective cams are arranged in the 180° out-of-phase relationship. Associated with each of the cams 143 and 144 is a bar or contact blade adapted to ride on the respective cam. That is, a contact bar or blade 147 is pivoted at 148 and provided with a transversely projecting cam follower 149 adapted to ride on the dwell of cam 143 and engage in the recess 145. In the condition illustrated, the follower 149 is riding on the dwell of cam 143, and thus in its elevated, open condition, as will appear presently. Similarly, a contact bar 150 is associated with the cam 144 and pivoted at 151, including a transversely projecting cam follower 152 adapted to ride on the dwell of the cam and engage in its recess 146. As illustrated, the contact bar 150 is swung downward, having its follower 152 engaged in the recess 146.

Following the circuitry, it will be observed that supply line $L_2$ is connected to a pair of branch lines 154 and 155, the former branch line being connected through a normally closed push-button stop switch 162 to the normally closed switch 137 of the switch assembly 86, and the latter of the branch lines being connected through a normally closed push-button stop switch 163 to the normally closed switch 141 of the switch assembly 139. From the other side of the switch 137 extends a conductor 156 which connects to one side of an upstarter 157 for the head-driving motor 62. Operation of the upstarter 157 actuates the motor 62 to effect upward movement of the head 22. The upstarter 157 is connected by a conductor 158 and through normally open, hold-down or self-holding relay contacts 159, to a conductor 171. Connected in parallel with the hold-down contacts 159, as by a conductor 160, is a manual start switch 161.

The other branch-line conductor 155 from the supply line $L_2$ is connected through the normally closed switch 141 of switch assembly 139 by a conductor 164 to one side of a downstarter 165 of the head-driving motor 62. The downstarter is connected through a conductor 166, which includes normally open, self-holding or hold-down contacts 167, to a conductor 176. A manually operable start switch 168 is connected by a conductor 169 in parallel with the hold-down relay 167.

From its point of connection to the lines 154 and 155, the line $L_2$ extends to one terminal of the motor 62. The supply line $L_1$ is connected through a pair of conductors 170u and 170d with additional respective terminals of the motor 62, which conductors include respective power switches 182u and 182d, so that the motor 62 may be placed across the supply lines through either the upstarter or the downstarter to effect up or down movement of the head 22, respectively. Suitable safety interlocks 183, 184, and 185 are provided between the switches 182u and 182d, relay contacts 159 and 167, and starters 157 and 165 to prevent simultaneous actuation thereof.

Extending from the line or conductor 158 between the upstarter 157 and the hold-down contacts 159 is a conductor 172 which terminates at a contact 173 located to make and break electrical connection with respect to the contact blade or bar 147 when the follower 149 thereof is in the cam recess 145 or on the dwell of the cam respectively. Similarly, a conductor 174 is connected to the conductor 166 between the downstarter 165 and hold-down-relay contacts 167 and extends therefrom terminating in a contact 175 adapted to make and break electrical connection with the pivoted contact bar 150 upon respective engagement of the follower 152 in the recess 146 and follower engagement with the dwell of the cam. Thus, it will now be appreciated that the contact bar 147 and contact 173 cooperate to define a switch operated by the cam 143, while the bar 150 and contact 175 cooperate to define a switch operated by the cam 144.

From the line $L_1$ extend a pair of branch conductors 177 and 178, the former being connected to one side of the normally open switch 138, and the latter being connected to one side of the normally open switch 142.

From the other side of the switch 138 extends a conductor 179 which connects to the pivot 151 for electrical connection to the contact bar 150. A conductor 180 extends from the other side of the normally open switch 142 to the pivot 148 for electrical connection to the contact bar 147.

A pair of contacts 187 and 188 are respectively associated with the contact bars 147 and 150 to be electrically engaged thereby upon the elevation of the bars to their dwell condition out of the respective cam recesses. The contacts 187 and 188 are connected in parallel by conductors 189 and 190 to a conductor 191 which is connected to a horizontal starter 192 associated with the horizontal drive motor 46. That is, a power line or conductor 193 is connected from supply line $L_1$ to one side of the motor 46 and is provided with a power switch 194. The other supply $L_2$ is connected by a power line or conductor 195 with the other side or terminal of the motor 46. Connected to the conductor 193, through a conductor 199 having a push-button stop switch 200, is the horizontal starter 192. The starter is operatively connected to actuate the switch 194, as diagrammatically indicated at 201.

Referring now again to FIGURES 1 and 2, the mode of apparatus operation and the method of the present invention proceed as follows: The plate 23 to be blasted or treated is placed in upright or vertical condition on the rollers 42 of the conveyor 21, and intermittently moved by the conveyor longitudinally therealong. The plate is supported in its upright condition by the guide rollers 50. With the plate 23 in position between the blasting heads 22 on opposite sides of the plate, the blasting heads are simultaneously moved vertically, say downward, while the plate remains stationary, to blast or treat a vertical strip or area on each side of the plate. At the lowermost position of movement of the heads 22, the conveyor 21 effects movement of the plate horizontally therealong an increment slightly less than the width of the treated strip or area as adjusted by the variable-speed drive 153, while the heads or hoods 22 remain stationary. The heads or hoods 22 then move simultaneously, vertically upward to treat or blast an additional contiguous, and preferably slightly overlapping strip or area of the plate, while the latter remains stationary, the vertical head speed being adjustable by the drive 62. When the heads or hoods 22 reach the upper edge of the plate 23, their vertical movement ceases, and the plate is again shifted horizontally by the conveyor 21 a distance slightly less than the width of a treated strip. This procedure continues until the plate is completely treated, and is entirely automatic in operation, as will appear presently.

The resilient universal mounting of the rings 83, as achieved by the spring elements 84, permits sufficient movement of the rings to accommodate for variations in and contours of the plate surfaces while maintaining close contact therewith during vertical movement of the hoods. In blasting the leading- and trailing-edge region of a plate, it may be desirable to slightly retract the extension tubes 80 to withdraw the rings 83 from contact with the plate for entry of the plate and to prevent jamming or cocking of the rings.

The treating media, such as sand or other abrasive material, is conveyed pneumatically from the blasting unit 126 through the flexible conduit or hose 76, discharging from the nozzle 75 interiorly of each respective hood 22 and through the aligned ring 83 to impinge upon the surface being treated. While a slight vacuum is maintained interiorly of each hood 22, this is insufficient to have any appreciable effect upon the high-momentum abrasive being discharged from the nozzle 75. However, after impingement of the abrasive against the plate surface, the relatively spent, rebounding abrasive material is redrawn into the collecting hood and passes therefrom vertically downward through the telescopic members of the collecting means 24 in the relatively low-velocity downwardly moving airstream thereof. It is believed that larger or heavier abrasive particles pass gravitationally downward through the collecting means 24, while the relatively fine abrasive particles pass downward therethrough in suspension in the airstream. The relatively heavy abrasive particles are deflected laterally by the conduit or boot 98 into the lower or bottom region of the casing 112, while the relatively light abrasive particles are carried by the airstream laterally through the conduit 98 into the lower region of the housing or casing 112 and vertically upward therein to the upper end thereof. The airstream passes thence laterally through the casing connection 114 into the upper region of casing 113 and carries with it relatively light abrasive material. Air is withdrawn from the casing 113 through the outlet 119 and conduit 120 to the separator 121; and, the lighter abrasive particles carried with the air thus pass to the separator for separation of dust and fines.

The relatively heavy abrasive particles collect in the lower region of the casing 112 and may be elevated therein by the bucket elevator 115, which, at its upper end, discharges the elevated abrasive onto the declining plate 117 in the passageway 116 for gravitational sliding movement of the discharged abrasive into the casing 113 at an elevation above that of the outlet opening 119. The lightest-weight abrasive particles falling from the plate 117 in the casing 113 are withdrawn by the airstream for passage through the outlet 119 and conduit 120 to the separator 121. The medial range of abrasive particles falling in the casing 113 from the plate 117 fall onto the plate 124 for discharge through the conduit 123. This abrasive material is reclaimed and may be sold for other uses. The heavier particles falling in the casing 113 from the plate 117 continue past the plate 124 to the lower end of the casing for reuse by the blasting machine 126. As required, new abrasive may be introduced through the conduit 125 to make up the abrasive lost to the system. As noted hereinbefore, relatively fine abrasive may be taken from the cyclone separator 121, while the harmful dust is recovered in the baghouse 133.

From the foregoing, the over-all operation of the apparatus is believed to be clearly demonstrated, or obvious from the description thereof.

A description of the operation of the control system follows. In the condition illustrated in FIGURE 10, the treating head 22 is just ready to start its vertical downward movement. The limit switch 86 has its finger 87 just over or off the plate beyond the upper edge, so that the normally closed switch 137 is open and the normally open switch 138 is closed. The horizontal drive motor 46, through its variable speed reducer drive 44 has just shifted the plate 23 horizontally, by rotation of the roller 42. This has caused the contact bar 50 to fall, its cam follower 152 being received in the recess 146. Thus, a previously closed circuit from line $L_1$, through conductor 177, switch 138, conductor 179, contact bar 150, contact 188, conductors 190 and 191, horizontal starter 192, conductor 199, switch 200, conductor 198, and line $L_2$ has just been opened. This has just caused opening of the power switch 194 to deenergize the horizontal drive motor 46. Simultaneously, the contact bar 150 engages the contact 175 and closes a circuit through line $L_1$, conductor 177, switch 138, conductor 179, bar 150, contact 175, conductor 174, conductor 166, downstarter 165, conductor 164, switch 141, conductor 155, and line $L_2$. This energization of the downstarter through the switch 150, 175, effects closure of the power switch 182d and closure of the holddown contacts 167. The downstarter may remain energized even after opening of the switch 150, 175 by continued energization of the downstarter 165 through the conductor 166, contacts 167, conductors 176 and 170d, to line $L_1$. Hence, upon downward movement of the head 22 effected by operation of the motor 62 resultant upon closure of switch 182d, the switch 138 opens, but the downstarter remains energized to continue downward head movement.

Upon downward head movement sufficient to engage the finger 140 of switch 139, which event is preferably arranged coincident with movement of the head 22 to the lower edge of the plate 23, the switch 141 is opened and the switch 142 is closed. Opening of the switch 141 deenergizes the downstarter 165, so that the power switch 182d and hold-down contacts 167 are opened, causing cessation of downward head movement by the motor 62. This closure of switch 142 closes a circuit through line $L_1$, conductor 178, switch 142, conductor 180, bar 147, contact 187, conductors 189 and 191, horizontal starter 189, conductor 199, switch 200, conductor 198, and line $L_2$. The horizontal starter is thus energized to close the power switch 194 and effect rotation of the conveyor rollers 42 to shift the plate 23 horizontally. Simultaneously, the cams 143 and 144 are rotated 180° together with each other. At this time, the follower 149 of bar 147 falls into recess 145 of cam 143 to open the above-described horizontal starter circuit through the contact 187 and thereby deenergize and stop the motor 46 to terminate horizontal movement of the plate 23. The bar 147 is then in contact with the contact 173 to close a circuit through the upstarter contacts 157 to effect upward movement of the head 22 by energization of the motor 62 in a manner analogous to that described hereinbefore regarding downward movement of the head 22. The hold-down 159 functions in a manner similar to the hold-down-relay contacts 167 to maintain the upstarter energized upon opening of the switch 142 as the head 22 leaves contact with the finger 140 of the switch 139. Thus, the hereinbefore described cycle of operation may be continuous and completely automatic. However, various manual switches 162, 163, 161, 168, and 200 are provided to interrupt and start the operation as desired.

It is now appreciated that the control system of FIGURE 10 provides for the sequential control of a plurality of operations, say the vertical upward and vertical downward movements of the head 22, and the interposition between each successively adjacent pair of vertical head movements of an additional operation, such as that of horizontal plate movement. The variable-speed drive or motor 62, while shown as a single reversible motor, may be considered as a pair of operators respectively corresponding to the upward and downward operations of head movement. The horizontal-drive motor 46 may of course be considered as an operator for effecting the horizontal plate movement. The normally closed switches 137 and 141 are respectively connected in control circuits for the upward and downward operation of the head 22 by the motor 62, such control circuits including respective starter and hold-down contacts. The normally closed switch 137 in the up-operation control circuit is opened at the cessation of the up operation, while the normally closed switch 144 in the down-operation control circuit is opened at the cessation of the down operation. Of course, the normally open switches 138 and 142 are interlocked with their respective normally closed switches 137 and 141, but from the foregoing description of operation, it is apparent that the normally open switch 138 is in the down-operation circuit, while the normally open switch 142 is in the up-operation circuit, and that these switches are closed responsive to the completion of the respective preceding operation. That is, the switch 138 in the down-operation circuit is closed upon completion of the preceding up operation, while the normally open switch 142 in the up-operation circuit is closed responsive to the completion of the down operation. The additional operator, namely the horizontal-drive motor 46, is connected to both the cam-operated switch means 150, 175, and 147, 173, which switch means are respectively connected to the down- and up-operation circuits. Thus, as described hereinbefore in detail, the switch means 150, 175, and the switch means 147, 173 are connected to alternately open their respective contacts 188 and 187 when their respective contacts 175 and 173 are closed in the down- and up-operation circuits. Further, the cams 144 and 143 serve to open both the contacts 175 and 173 to open both the down- and up-operation circuits when the horizontal-operation circuit is closed.

While the preceding description indicated that a pair of separate and identical abrasive-handling systems 26 may be provided on opposite sides of the conveyor 21, it is, of course, appreciated that all of the sand from both blasting heads 22 and collector means 24 may be handled by a single abrasive-handling system of the required capacity.

Although a preferred embodiment of the present invention has been illustrated and described in detail hereinbefore, several embodiments of the invention, showing slight modifications thereof, are illustrated in FIGURES 11–17. FIGURE 11 illustrates in somewhat diagrammatic form the preferred embodiment, to clarify understanding of the subsequent embodiments. Thus, FIGURE 11 illustrates the roller- or belt-type conveyor means 21 and the upstanding plate 23 horizontally carried by the conveyor means. The arrow 200 indicates that the conveyor means 21 is operable in opposite directions for moving the plate 23 back and forth, or in either desired direction. The blast head 22 is connected to the collector means 24, the latter being either of the telescoping-tube construction illustrated hereinbefore, or of any suitable extensile and retractile tubular construction, such as rubber tube. A double-headed arrow disposed generally vertically is associated with the blast head 22 and vertically extensile and retractile collector means 24 to indicate that the blast head is vertically movable in opposite directions. While the conveyor 21 was described hereinbefore as being moved intermittently small increments corresponding to the width of a vertical treated strip on the plate 23, and the blast head 22 was described as being vertically reciprocable throughout a stroke comparable to the vertical extent of the plate 23, it is understood that the conveyor 21 may cause horizontal reciprocation of the plate 23 through a stroke approximating the horizontal extent of the plate, with vertical intermittent movement of the blast head 22 small increments corresponding to the width of a horizontal treated strip of the plate. Stated otherwise, the relative movements of the plate 23 and blast head 22 may be such as to treat the plate in horizontal strips or stripes, as well as vertical strips or stripes. The abrasive-handling system 26 of the preferred embodiment is also diagrammatically shown in FIGURE 11.

In FIGURE 12 is shown an embodiment including roller- or belt-conveyor means 21a for supporting an upstanding plate 23a and moving the latter horizontally, as in the preferred embodiment. A blasting head 22a is mounted for vertical movement and connected to the upper end of extensile-and-retractile collecting means 24a, such as telescopic tubes or an expansile hose. The double-headed arrows 200a and 201a, respectively associated with the plate 23a and blasting head 22a, indicate that the plate may move horizontally by increments and the blast head reciprocate vertically a stroke approximating the vertical extent of the plate, or that the blast head may move vertically by small increments and the plate reciprocate horizontally a stroke approximating its horizontal extent. The tubular collecting means 24a depends at its lower end to a downwardly openable one-way valve or flap 202 for gravitationally discharging the relatively heavy and reusable abrasive, as in the direction of the arrow 203. Suitable means (not shown) may be employed for receiving and handling the reusable abrasive. A branch conduit 204 extends laterally from the collector means 24a at a location spaced above its lower end for the removal therethrough by suction of the relatively light abrasive and air, as in the direction of arrow 205.

In the embodiment of FIGURE 13 are shown plate-conveyor means 21b of the type described hereinbefore,

What is claimed is:

1. Apparatus for surface treating a metal article, said apparatus comprising: means for handling a metal article with the surface thereof to be treated in generally upright disposition, a fluid-pressure nozzle for projecting a stream of abrasive and carrying gas against said metal surface to treat the latter, a closed hood fixedly and spacedly surrounding the discharge end of said nozzle for receiving said stream, said hood being adapted to be located contiguous to the surface to be treated, communicating means on said hood proximate to said article and defining an opening communicating laterally from the interior of said hood to and facing toward said article surface, said opening being located in alignment with and of a size larger than said stream for spacedly passing the abrasive to said surface and passing abrasive particles rebounding from said surface and returning through said opening into said hood, depending fluid-conduit means extending downwardly from said hood for gravitationally passing the rebounded abrasive particles and gas generally downward, a separator connected to said depending fluid-conduit means for gravitationally receiving the heavier abrasive particles and fines carried therewith and receiving the gas and its entrained fines to separate the fines from the heavier abrasive particles, a source of fluid under pressure, pressure-conduit means communicating between said source and nozzle for delivering said heavier abrasive particles to said nozzle for repeated projection by said nozzle, and means for moving said nozzle relative to said surface for projecting said abrasive against a selected area of said surface.

2. Apparatus according to claim 1, said handling means comprising a row of generally horizontal laterally aligned rollers for supporting engagement with the metal article, guide means on at least one side of said row of rollers for guiding an article on said rollers, and power means connected to said rollers for driving the latter to move an article between said guide means.

3. Apparatus according to claim 1, said moving means comprising means for raising and lowering said projecting means, and means for moving said article generally horizontally.

4. In the method of surface treating a metal article, the steps which comprise: positioning said article with the surface to be treated generally upright, projecting a stream of abrasive against the generally upright surface, gravitationally conducting the abrasive particles after impingement upon said surface to a separator, conducting a carrier gas at a low velocity to the separator to operate the same for removing the fines and collecting the heavier abrasive particles, and returning the collected heavier abrasive for repeated projection against said surface.

5. The method according to claim 4, further characterized by effecting relative movement of said stream of abrasive and said article with the surface to be treated generally upright, to treat a selected area of the surface.

6. The method according to claim 5, wherein said relative movement is effected by moving said stream generally up and down, and by moving said article generally horizontally.

7. In the method of surface treating a metal article, the steps which comprise: positioning said article with the surface to be treated generally upright, providing a closed chamber contiguous to said surface and having an opening facing toward said surface, projecting a stream of abrasive from said chamber spacedly through said opening against said surface and generally normal to said surface so that abrasive particles rebound from said surface and return through said opening into said chamber, gravitationally conducting the abrasive particles after impingement upon said surface to a separator, and conducting a carrier gas at a low velocity to the separator to operate the latter for removing the fines and collecting the heavier abrasive particles.

8. In the method of treating a metal surface, the steps which comprise: providing an enclosure having an opening contiguous to and facing toward said surface, directing a stream of abrasive particles from said enclosure through said opening so that rebounding abrasive particles return to said enclosure through said opening, gravitationally conducting the rebounded particles to a separator, and applying a slight suction to said enclosure sufficient to conduct a carrier gas and any entrained fines to said separator and prevent its escape to the atmosphere.

9. In apparatus for treating a metal surface with abrasive, the combination comprising: a generally horizontal nozzle for directing a generally horizontal stream of abrasive and gas against a generally upright surface to be treated, a hood fixedly mounted in spaced surrounding relation with respect to the outlet of said nozzle, a generally vertically disposed wall mounted on said hood facing the nozzle outlet and having an opening for spacedly passing a stream of abrasive from said nozzle, a generally horizontal open ended tubular follower conformably received in said opening in substantial alignment with said nozzle and having one end projecting exteriorly of said wall for engaging the surface to be treated, said tubular follower having an internal diameter greater than that of said nozzle for spacedly receiving said stream and permitting return of rebounding gas and particles, and means resiliently mounting said follower on said wall for floating movement in engagement with the metal surface, whereby abrasive particles from said stream rebounding from said surface return through said follower to the interior of said hood.

10. Apparatus according to claim 9, said follower mounting means comprising a plurality of springs spaced circumferentially about the exterior of said follower and each connected to said follower and said wall.

11. In apparatus for treating a metal surface with abrasive, the combination comprising: a laterally disposed nozzle for directing a lateral stream of abrasive against a generally upright surface to be treated, a hood fixedly mounted in spaced surrounding relation with respect to the outlet of said nozzle, a generally upright disposed wall mounted on said hood facing the nozzle outlet and having an opening for spacedly passing a stream of abrasive from said nozzle, a laterally extending open-ended tubular follower in said opening in substantial alignment with said nozzle and having one end projecting exteriorly of said wall for engaging the surface to be treated, means resiliently mounting said follower on said wall for floating movement in engagement with the metal surface, whereby abrasive particles from said stream rebounding from said surface return through said follower to the interior of said hood, means mounting said nozzle and hood for up-and-down movement, and a generally upright telescopic conduit having its upper end connected to the underside of said hood in fluid communication therethrough and depending therefrom for conducting said returned particles away from said hood.

12. Apparatus according to claim 11, said telescopic conduit comprising a plurality of vertically disposed tubular sections arranged with the upper end region of each section spacedly receiving the lower end region of the next upper section, a plurality of sets of vertically spaced rollers mounted about the upper end region of each receiving section in rolling engagement with the respective received section, an annular internal shoulder in the upper region of each receiving section, and an annular external shoulder on the lower region of each received section, the external shoulders being engageable respectively with the internal shoulders of the next lower receiving sections for extending the latter and sealing the space therebetween.

13. In apparatus for treating a metal surface with abrasive, an improved telescopic conduit comprising a plurality of vertically disposed tubular sections arranged with the upper end region of each section spacedly receiving the lower end region of the next adjacent upper section, a plurality of pairs of vertically spaced rollers carried excarrying an upstanding plate 23b. The collector means 24b includes not only a vertically extending expansile tubular conduit and a blast head 22b, but also includes a separator 206 connected between the blast head and the collector-means conduit for vertical movement therewith. The separator 206 may be of any desired construction, such as a trap, cyclone, or other, and includes a lateral discharge tube 207. The separator 206 operates upon the collected abrasive to pass the reusable, relatively heavy abrasive gravitationally downward through the conduit of the collector means 24b, say for discharge into a receiver 209 and reused as desired. Relatively fine abrasive and air may be discharged through the conduit 207, in the direction of arrow 208. The embodiment of FIGURE 13 is similar to that of FIGURE 12, except that the separator is employed to aid and more accurately control the gravitational separation of abrasive. The double-headed arrows 200b and 201b, respectively associated with the plate and collector means indicate that movement thereof may take place as described hereinbefore in connection with FIGURES 11 and 12.

The embodiment of FIGURE 14 is similar to that of FIGURE 13, but the expansile and retractile tubular conduit of the collector means is omitted. In particular, horizontal-conveyor means 21c are provided for conveying the upstanding plate 23c, and the collector means 24c includes a blasting head 22c and an abrasive separator 206c carried by the blasting head for separating rebounding abrasive particles collected by the blasting head. A lateral discharge conduit 207c may extend from the separator 206c for carrying away air and relatively fine abrasive in the direction of the arrow 208c.

The plate 23c and collector means 24c are movable in the manner described hereinbefore in connection with FIGURES 11–13, as indicated by the double-headed arrows 200c and 201c. Directly below the blast head 22c and separator 206c is a receiver or bin 209c. Suitable means is provided on the underside of the collector 206c for gravitationally discharging the relatively heavy abrasive to the receiver 209c, say when the separator is at its lowermost point of vertical travel. The receiver 209c may of course include any desired means for reusing the received abrasive.

In the embodiment of FIGURE 15, the conveyor means 21d is of the overhead or suspension type and may include an overhead rail or track 210 supporting one or more crane carriages or hoists 211 for movement along the track. The plate 23d is arranged vertically and suspended from the cranes 211, as by cables 212 and clamps (not shown). Of course, the plate 23d may be suspended by other suitable means, such as a frame or the like carrying the plate.

A fixed blasting head is designated 21d, and is associated with fixed collector means 24d, which may include a separator 206d having a lateral discharge for air and fine abrasive, as at 207d. Suitable abrasive-handling means is diagrammatically represented by a receiver 209d, which, of course, may also include any suitable apparatus for returning the reusable abrasive to the blast head 22d. In this embodiment, the plate 23d is movable both horizontally and vertically, as indicated by the double-headed arrows 213 and 214, respectively, and may be selectively moved a full-length stroke horizontally with vertical increments, or a full-length stroke vertically with horizontal increments, or combinations thereof, as desired.

The embodiment of FIGURE 16 illustrates a plate 23e to be treated, and supported in fixed position by any suitable means (not shown). A pair of generally vertically disposed uprights or columns 215 are fixed in position outward of opposite ends of the plate 23e, and a generally horizontally disposed beam or rail 216 extends between the columns having its opposite ends mounted thereon by suitable carriage means 217 for vertical up-and-down movement. A blasting head 22e is mounted on the beam 216 by a carriage 218 for movement horizontally back and forth along the beam. Suitable abrasive-collecting means 24e depends vertically from the blasting head 22e, and includes separator means 206e immediately beneath the blasting head. A lateral discharge conduit 207e extends from the separator means 206e for conducting away air and fine abrasive, while the heavier abrasive falls gravitationally to a conveyor or receiver 209e which may include abrasive-handling means for recirculating the heavy abrasive to the blasting head.

Thus, the plate 23e remains fixed, while the blasting head is movable vertically in both directions along with the beam or rail 216, as indicated by the arrow 219, and is also movable horizontally relative to or longitudinally along the beam 216, in opposite directions, as indicated by the arrow 220. Of course, the blasting head may move a full horizontal stroke the width of the plate, and vertical increments between the horizontal strokes, or full vertical strokes the height of the plate with horizontal increments between the vertical strokes, or any combination thereof.

The embodiment of FIGURE 17 combines certain features of the embodiments of FIGURES 16 and 15, the vertical plate 23f being suspended by crane means 211f, and the blasting head 22f being movable horizontally along a beam 216f. In particular, the plate 23f is suspended in vertical disposition by any suitable means from the crane means 211f and vertically movable in opposite directions by the latter, as indicated by the double-headed arrow 214f. The blasting head 22f may include suitable collecting or separating means 24f, and is carried by a carriage 218f for horizontal movement in both directions longitudinally along the beam 216f, as indicated by the double-headed arrow 220f. Here again, the plate 23f may move vertically in full strokes approximating the vertical extent of the plate, and the blasting head 22f move in relatively small horizontal increments intermediate the vertical strokes of the plate, or the blasting head may move in horizontal strokes the full width of the plate and the plate move in small vertical increments intermediate the horizontal strokes, or a combination of such motions.

Of course, the diagrammatic representations of FIGURES 11–17 are intended to comprehend similar blasting treatment of the plate simultaneously on both surfaces thereof, either with separate and independent abrasive-material-handling systems or with a combined abrasive-material-handling system. Also, the above-discussed crane means for moving the plate is intended to comprehend monorail constructions, hoists, and combinations thereof.

While the preferred embodiment is disclosed as employing fingers 87 and 140, and their limit switches for sensing and responding to edges of the plate, it is, of course, appreciated that various types of sensing means may be substituted therefor, such as proximity switches, photoelectric switches, and the like.

It wil now be understood that the method and apparatus of the present invention may be carried out substantially automatically with a considerable savings in cost, highly increased accuracy or uniformity of blasting, and with the substantial elimination of dust in the ambient atmosphere. Further, the method and apparatus of the instant invention effectively separate the reusable abrasive from the lighter abrasive particles by effectively combining relatively low-speed air movement and gravity.

From the foregoing, it is seen that the present invention provides a method and apparatus which fully accomplish their intended results, and are well-adapted to meet practical conditions of manufacture, maintenance, and use.

Although the present invention has been described in some detail by way of illustration and example for purposes of clarity of understanding, it is understood that certain changes and modifications may be made within the spirit of the invention and scope of the appended claims.

teriorly on and circumferentially spaced about the upper end region of each receiving section and extending radially inward therefrom for rolling engagement with the respective received section, an annular internal shoulder in the upper region of each receiving section, and an annular external shoulder on the lower region of each received section, each external shoulder being engageable with the internal shoulder of the next lower receiving section for extending the latter and sealing the space therebetween.

14. Apparatus according to claim 13, the vertically spaced rollers of each pair being respectively located above and below the upper end of the carrying section, and the lower roller of each pair extending radially inward through the carrying section.

15. In apparatus for treating an article, the combination comprising longitudinal conveyor means for effecting longitudinal movement of the article, electric conveyor operator means for actuating said conveyor means, treating means mounted for reciprocatory movement transverse of said conveyor means for treating a transverse zone of said article, first electric operator means for actuating movement of said treating means in one direction, second electric operator means for actuating movement of said treating means in the other direction, a first control circuit connected to said first electric operator means for energizing the latter, first normally open switch means in said first control circuit closable responsive to extreme movement of said treating means in said other direction, a second control circuit connected to said second electric operator means for energizing the latter, second normally open switch means in said second control circuit closable responsive to extreme movement of said treating means in said one direction, first normally closed switch means in said first control circuit openable responsive to extreme movement of said treating means in said one direction, second normally closed switch means in said second control circuit openable responsive to extreme movement of said treating means in said other direction, first double-throw switch means connected in said first control circuit with one contact external to said first control circuit, second double-throw switch means connected in said second control circuit with one contact external to said second control circuit, means operatively connected between said conveyor means and said first and second double-throw switch means to maintain said one contacts closed and other contacts of said double-throw switch means open when said conveyor means is actuated and alternately close said other contacts at successive terminations of conveyor-means actuation, and an additional control circuit connected to said conveyor operator means for energizing the latter and including a pair of branch lines respectively connected to said one contacts of said first and second double-throw switch means to define a pair of parallel branch circuits respectively through said first and second normally open switch means, whereby said conveyor means is actuated by energization of said conveyor operator means through the branch circuit of the control circuit having its normally open switch means closed.

16. A system for treating an article, said system comprising conveyor means for effecting movement of the article along a path, treating means mounted for reciprocation transversely of the movement of said conveyor means for treating a zone of an article carried by said conveyor means, a pair of operator means electrically connected to said treating means for actuating the latter in respective directions of its reciprocation, a pair of normally closed switch means respectively connected to said pair of operator means and each opened responsive to the completion of treating-means movement in the direction actuated by the associated operator means, a pair of normally open switch means respectively connected to said pair of operator means and each closed responsive to the completion of treating-means movement in the direction actuated by the operator means connected to the other normally open switch means, additional operator means electrically connected to said conveyor means and in parallel with each of said pair of operator means and its associated normally closed switch means, a pair of additional switch means each connected to one of said pair of operator means and to said additional operator means for alternately opening the connection to said additional operator means when the connection between the associated one of said pair of operator means and normally open switch means is closed and to open the connection between the associated one of said pair of operator means and normally open switch means while closing the connection between said additional operator means and the associated normally open switch means, and means operatively connected to said conveyor means and all of said additional switch means for closing the latter to all of said normally open switch means during actuation of said conveyor means and successively closing said additional switch means to an alternate one of said pair of operator means at each cessation of conveyor-means actuation, whereby said conveyor means is intermittently actuated and said treating means is alternately actuated in opposite directions between successive actuations of said conveyor means.

17. A system according to claim 16, said last-named means comprising a pair of cam means respectively operatively connected to said pair of additional switch means in out-of-phase relation with each other.

18. A system for treating an article, said system comprising conveyor means for effecting movement of the article along a path, treating means arranged along said path for performing a plurality of operations on an article carried by said conveyor means, a plurality of operator means electrically connected to said treating means for actuating respective operations thereof, a plurality of normally closed switch means respectively connected to said plurality of operator means and each opened responsive to the completion of the treating-means operation of the associated operator means, a plurality of normally open switch means respectively connected to said plurality of operator means and each closed responsive to completion of the respective preceding treatment-means operation, additional operator means electrically connected to said conveyor means and in parallel with each of said plurality of operator means and its associated normally closed switch means, a plurality of additional switch means each connected to a respective one of said plurality of operator means and to said additional operator means for alternately opening the connection to said additional operator means when the connection between the associated one of said plurality of operator means and normally open switch means is closed and to open the connection between the associated one of said plurality of operator means and normally open switch means while closing the connection between said additional operator means and the associated normally open switch means, and means operatively connected to said conveyor means and all of said additional switch means for closing the latter to all of said normally open switch means during actuation of said conveyor means and successively closing said additional switch means to successive ones of said plurality of operator means at each cessation of conveyor-means actuation, whereby said conveyor means is intermittently actuated and said treating means is successively actuated to perform its respective operations between successive actuations of said conveyor means.

19. A system for the sequential control of a plurality of operations and an additional operation interposed between each successively adjacent pair of said plurality of operations, said system comprising a plurality of operators respectively corresponding to said plurality of operations, a plurality of control circuits respectively connected to said plurality of operators, normally closed switch means in each of said control circuits and each opened responsive to the completion of the respective operation, normally open switch means in each of said control circuits and each closed responsive to the completion of the respective preceding operation of said plurality of operations, an additional operator corresponding to said additional operation, an additional circuit connected to said additional operator and including a plurality of branch lines, additional switch means in each of said plurality of control circuits and respectively connected to said plurality of branch lines, said additional switch means each being connected to alternately open the respective branch line when closed in its control circuit and open its control circuit to close its branch line through the normally open switch means of its control circuit, and means operatively connected to said additional operator and all of said additional switch means to maintain said branch lines closed and said control circuits open when said additional operator is actuated and sequentially close said control circuits at successive terminations of additional-operator actuation.

20. A system according to claim 19, said plurality of control circuits being connected in parallel with each other.

21. A system according to claim 19, said last-named means comprising a plurality of out-of-phase cams all connected to said additional operator and respectively connected to said additional switch means.

22. A system according to claim 21, in combination with variable-speed-drive means interposed between said additional operator and said plurality of cams.

23. A system according to claim 19, said additional circuit and each of said branch lines being connected in parallel with a respective one of said plurality of operators and its associated normally closed switch means.

24. Apparatus for treating a metal surface with abrasive, comprising a closed hood having one wall adapted to face toward a metal surface being treated and formed with a through opening, a nozzle fixed in said hood having its discharge end in alignment with said wall opening for discharging abrasive through said wall opening, an open-ended tubular member conformably and movably received in said wall opening in substantial alignment with said nozzle and having one end projecting exteriorly of said wall for engagement with a surface being treated, and resilient means mounting said tubular member on said wall for resilient floating movement with said one end in engagement with the metal surface upon relative movement of said hood and metal surface.

25. Apparatus for treating a metal surface with abrasive, comprising a closed hood having one wall adapted to face toward a metal surface being treated and formed with a through opening, abrasive-projecting means in said hood for discharging abrasive through said wall opening, an open-ended tubular member conformably and movably received in said wall opening in substantial alignment with said abrasive-projecting means and having one end projecting exteriorly of said wall for engagement with a surface being treated, and resilient means mounting said tubular member on said wall for resilient floating movement with said one end in engagement with the metal surface upon relative movement of said hood and metal surface.

References Cited in the file of this patent

UNITED STATES PATENTS

| | | |
|---|---|---|
| 1,803,752 | Ford | May 5, 1931 |
| 1,935,956 | Schulenberg | Nov. 21, 1933 |
| 2,365,948 | Gossard | Dec. 26, 1944 |
| 2,628,455 | Webster | Feb. 17, 1953 |
| 2,637,948 | Bishop | May 12, 1953 |
| 2,686,991 | Powell | Aug. 24, 1954 |
| 2,729,918 | Van Denburgh | Jan. 10, 1956 |
| 2,766,557 | Pollard | Oct. 16, 1956 |
| 2,770,924 | Mead | Nov. 20, 1956 |